May 16, 1939.  C. E. GREGORY  2,158,624
BRAKE
Filed May 15, 1937
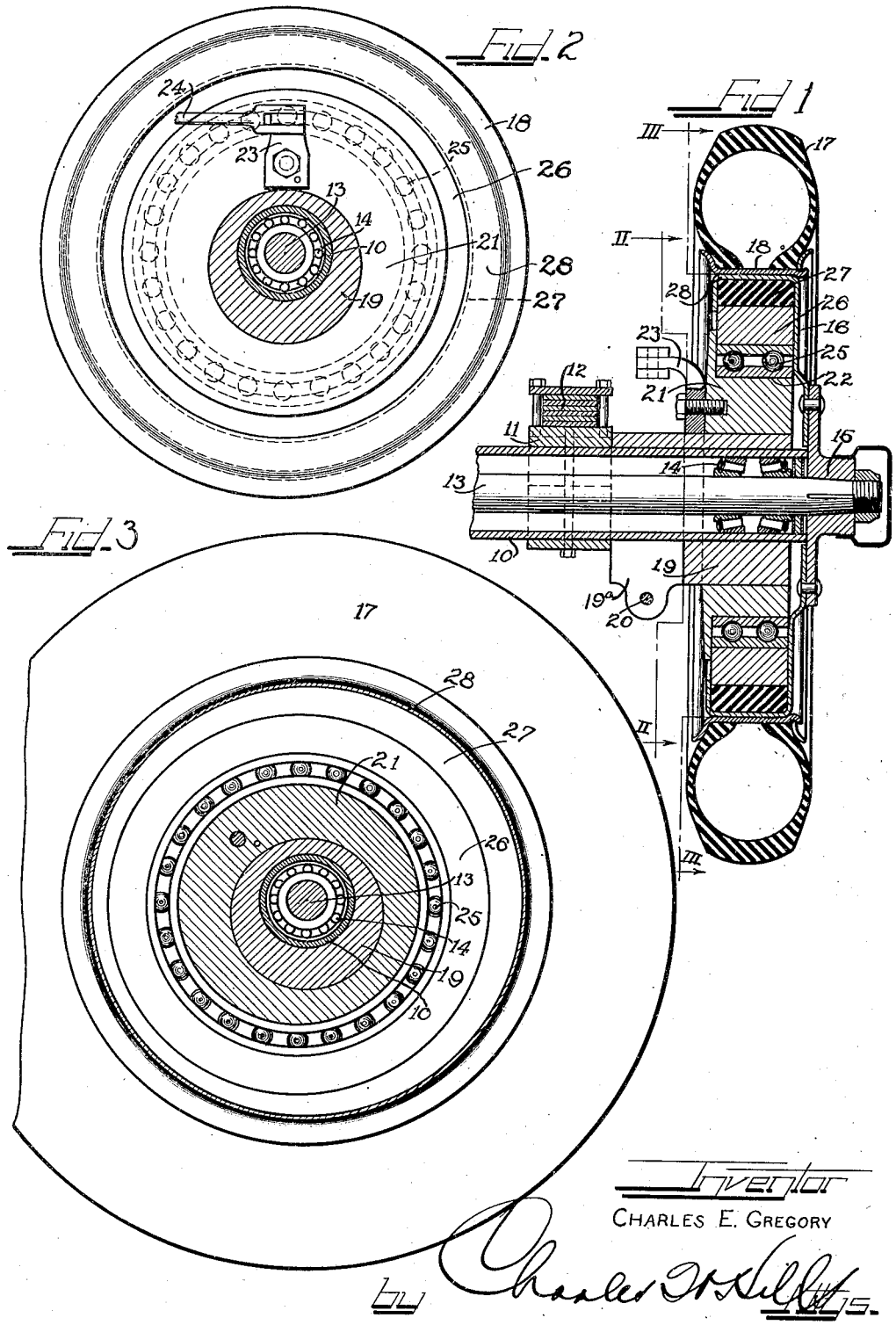
Inventor
CHARLES E. GREGORY Patented May 16, 1939

2,158,624

UNITED STATES PATENT OFFICE 2,158,624

BRAKE

Charles E. Gregory, Chicago, Ill.

Application May 15, 1937, Serial No. 142,728

2 Claims. (Cl. 188—136)

This invention relates to a novel braking system adaptable to use in automotive and other power systems either as a brake or as a clutch.

It is an object of this invention to provide an adjustable torque resisting mechanism for either resisting or transmitting torque, as between a rotating member and a relatively fixed point on its axis or between two relatively rotatable members. I have chosen to illustrate my novel invention as applied as an automotive vehicle brake wherein my invention acts to adjustably retard the rotation of the vehicle wheel at will. It will be understood that torque is equivalent to the eccentric application of a weight or couple relative to the axis of a rotatable body and my invention comprises providing resisting eccentric force by causing an eccentric member to rotate within a resilient displaceable or compressible member which resists the rotation of the eccentric and thereby produces braking or clutching torque.

It is also an object of this invention to provide an improved and self contained braking or clutching mechanism that can be simply operated in either direction with equal efficiency.

It is a furtther object of this invention to provide an improved and simplified braking system that can replace existing mechanical braking systems with a great reduction in the force required for brake application.

It is a further important object of this invention to provide an improved and simplified braking system that can be economically manufactured and installed and readily serviced by unskilled labor.

Other and further important objects of this invention will be apparent from the disclosures in the specification and the accompanying drawing.

This invention is illustrated in the drawing and hereinafter more fully described.

On the drawing:

Figure 1 is an axial section through a driving wheel embodying one form of the features of this invention.

Figure 2 is a section on the line II—II of Figure 1 showing parts in elevation the tire being omitted.

Figure 3 is a section on the line III—III of Figure 1 showing parts in elevation with the brake applied by rotation of the movable eccentric.

As shown I have chosen to illustrate my invention as applied to a driving wheel of an automobile, it being understood that the invention is equally applicable to steerable wheel 6 and for use as a clutch instead of a brake, as well as in non-automotive installations. With this understanding of the scope of usefulness of my invention, the following detailed description will be generally confined to the specific form chosen for illustrative purposes.

In the drawing, a portion of a conventional automobile rear axle system has been shown, including a housing or tube 10 which carries a spring seat 11 supporting a vehicle spring 12. A drive or axle shaft 13 is journaled in the end of the tube on bearings 14 and carries a wheel hub 15 keyed thereto on its outboard end, the hub in turn carrying a wheel disc 16 on which is mounted a tire 17 and its rim 18. The disc 16 serves to constrain the tire to rotation concentric to the axis of the drive or axle shaft regardless of the eccentric structure to be hereinafter described.

The brake of this invention is preferably applied within the space defined by the disc 16 and the rim 18, and comprises an eccentric member 19 mounted on the axle tube or housing 10 and clamped thereto in any suitable manner as by a bolt 20 drawing spaced ears 19a together. Rotatably mounted on the eccentric member 19 is a complementary eccentric or cam member 21 the exterior cylindrical surface 22 of which is designed to be concentric with the wheel and axle axis when positioned on the eccentric or cam member 19 in a definite relationship thereto. This complementary eccentric member can be shifted from its concentric relationship with the wheel and axle by means of a lever 23 attached thereto and operated by a brake rod 24. The cylindrical outer surface 22 of the member 21 carries an anti-friction bearing 25 surrounded in turn by a ring 26 cnsiderably smaller than the internal diameter of the tire rim 18, the space so left being occupied by a rubber ring 27 which may be conveniently retained in position by an inturned flange 28 forming part of the wheel disc 16.

In the operation of the illustrated form of my invention, the tire rim, disc, and axle are always concentric with each other, and when the brake is released the wheel is free to revolve with its driving axle. Under such conditions, the fixed and movable eccentric members 19 and 21 are positioned complementary to each other so that the periphery 22 of the movable eccentric member 21 is concentric with the axle, and the bearing 25, ring 26 and rubber ring 27 are also concentric with the axle and hence offer no resistance to rotation of the wheel.

If this movable eccentric 21 is shifted from its complementary position relative to the stationary eccentric 19, the bearing 25 and ring 26 are thrown out of concentricity with the wheel and axle and the ring 26 therefore displaces some of the material of the rubber ring 27 at the high point of the eccentricity of the ring 26 thus performing work on the rubber and providing resistance to the rotation of the wheel, which resistance will be proportional to the degree of eccentricity determined by the extent of angular displacement of the movable eccentric relative to its position complementary to the first eccentric. It will be evident that the bearing 25 protects the brake operating linkage from the resistance set up in the wheel, and that the eccentric 21 can be shifted in either direction to produce the braking effect, so that the brake can be applied either with or against the braking torque, as may be desired.

It will be evident that my invention is equally suitable for use as a clutch yieldingly connecting two rotatable members, and that it has similar advantages for such use.

It will thus be seen that I have invented an improved and self-contained braking mechanism that does not require excessive power to apply and is capable of absorbing braking energy in proportion to the degree of eccentricity without at any time being liable to rigid locking.

I am aware that many changes may be made and numerous details of construction may be varied through a wide range without departing from the principles of this invention and I, therefore, do not purpose limiting the patent granted hereon otherwise than necessitated by the prior art.

I claim:

1. In combination with a member constrained to rotate about a fixed axis, an eccentric member fixed relative to said axis, a movable eccentric member embracing said fixed eccentric member, said eccentric members being so proportioned that in one relative position the perimeter of the movable member is concentric with the fixed axis, means for shifting said movable eccentric member away from said relative position to produce eccentricity in the perimeter thereof, a rigid ring journaled on said movable eccentric, and resilient means disposed between said rigid ring and the rim whereby said resilient means will have internal work done thereon by the eccentricity of the perimeter of the movable member when so shifted from its position of concentricity.

2. A vehicle brake comprising in combination with a wheel and axle and axle housing, the wheel having a concentric surface suitable for a brake, an eccentric member fastened to the axle housing, a complementary movable eccentric cooperating with the first eccentric, brake operating linkage controlling the relative position of the movable eccentric relative to the fixed eccentric, a rigid ring journalled on said movable eccentric, and resilient means disposed between the rigid ring and the concentric braking surface of the wheel, whereby resultant eccentricity of the movable eccentric will distort the resilient means and thereby set up a retarding force on the wheel.

CHARLES E. GREGORY.